(12) United States Patent
Sato

(10) Patent No.: US 6,472,106 B1
(45) Date of Patent: Oct. 29, 2002

(54) POLYMERIC COMPOUND, POLYMER FOR POLYELECTROLYTE, AND COMPOSITION FOR IONICALLY CONDUCTIVE POLYELECTROLYTE

(75) Inventor: Takaya Sato, Chiba (JP)

(73) Assignee: Nisshinbo Industries Inc., Tokyo (JP)

( * ) Notice: Subject to any disclaimer, the term of this patent is extended or adjusted under 35 U.S.C. 154(b) by 0 days.

(21) Appl. No.: 09/622,346

(22) PCT Filed: Dec. 15, 1999

(86) PCT No.: PCT/JP99/07040

§ 371 (c)(1),
(2), (4) Date: Aug. 16, 2000

(87) PCT Pub. No.: WO00/35991

PCT Pub. Date: Jun. 22, 2000

(30) Foreign Application Priority Data

Dec. 17, 1998 (JP) .............................................. 10-358824

(51) Int. Cl.[7] .............................................. H01M 10/40
(52) U.S. Cl. ......................................... 429/317; 521/25
(58) Field of Search .............................. 429/317; 521/25

(56) References Cited

U.S. PATENT DOCUMENTS

| 4,597,838 A | 7/1986 | Bammel | |
|---|---|---|---|
| 5,268,243 A | * 12/1993 | Noda et al. | 429/317 X |
| 5,837,157 A | * 11/1998 | Kohjiya et al. | 429/317 X |
| 6,180,287 B1 | * 1/2001 | Watanabe et al. | 429/312 |

FOREIGN PATENT DOCUMENTS

| EP | 0 757 397 A | 2/1997 | |
|---|---|---|---|
| EP | 0 825 662 A | 2/1998 | |
| EP | 0 885 913 A | 12/1998 | |
| JP | A61-98752 | 5/1986 | |
| JP | A2-38451 | 2/1990 | |
| JP | A2-295004 | 12/1990 | |
| JP | 5-25353 A | 2/1993 | |
| JP | A9-194586 | 7/1997 | |
| JP | A10-204172 | 8/1998 | |
| WO | WO 95/13311 | * 5/1995 | H01M/10/40 |

OTHER PUBLICATIONS

Ogata et al., Journal of Japan Textile Society, 46 (2), pp. 52–57 (1990). Abstract Only, (month unknown).

* cited by examiner

*Primary Examiner*—Stephen Kalafut
(74) *Attorney, Agent, or Firm*—Birch, Stewart, Kolasch & Birch, LLP

(57) ABSTRACT

A polymeric polyol such as polyglycidol derivative wherein at least 10% of the ends of molecular chains are capped with monovalent groups, typically cyano-substituted monovalent hydrocarbon groups has a high ionic conductivity, remains amorphous even when an ion-conductive salt is dissolved in high concentrations, and is suitable as a polymer electrolyte.

10 Claims, 3 Drawing Sheets

POLYMERIC COMPOUND, POLYMER FOR POLYELECTROLYTE, AND COMPOSITION FOR IONICALLY CONDUCTIVE POLYELECTROLYTE

This application is the national phase under 35 U.S.C. § 371 of PCT International Application No. PCT/JP99/07040 which has an International filing date of Dec. 15, 1999, which designated the United States of America.

BACKGROUND OF THE INVENTION

1. Field of the Invention

This invention relates to novel polymeric compounds, polymers for polymer electrolytes comprising the same, and polymer electrolyte compositions having a high ionic conductivity.

2. Prior Art

Electrolytes used in secondary cells (batteries) and capacitors, for example, have up until now been primarily low-molecular-weight substances that are liquid at or above room temperature, such as water, ethylene carbonate, propylene carbonate, and tetrahydrofuran. In lithium-type cells in particular, use is commonly made of low-molecular-weight organic liquid electrolytes which tend to evaporate, ignite and burn rather easily. To ensure long-term stability, it is necessary to use a metal can as the outer cell enclosure and to increase the airtightness of the container. The result is a considerable rise in the weight of electrical and electronic components that use low-molecular-weight organic liquid electrolytes, and greater complexity of the production process.

Electrolytes can also be made of polymers. Such electrolytes have a very low volatility and thus are not prone to evaporation. Moreover, polymer electrolytes, as these are known, with a sufficiently high molecular weight can even be used as solid electrolytes that exhibit no fluidity at or above room temperature. They have the dual advantage of serving as a solvent for ion-conductive salts and of solidifying the electrolyte.

As an example of this type of polymer electrolyte, in 1978, Armond et al. at 1' Universite de Grenoble in France discovered that lithium perchlorate dissolves in solid polyethylene oxide, and reported that when the concentration of 1 M lithium salt is dissolved in polyethylene oxide having a molecular weight of about 2,000, the resulting complex shows an ionic conductivity of about $10^{-7}$ S/cm at room temperature. Other groups also reported that when the concentration of 1 M lithium salt is dissolved at room temperature in liquid polyethylene oxide having a molecular weight of about 200, the ionic conductivity at room temperature is about $10^{-4}$ to $10^{-5}$ S/cm. Thus, it is known that polymeric substances such as polyethylene oxide with the ability to dissolve ion-conductive salts function as electrolytes.

Since then, similar research has been carried out on a broad range of largely polyethylene oxide-related polymeric substances, such as polypropylene oxide, polyethyleneimine, polyurethanes and polyesters.

The most thoroughly investigated of these substances, polyethylene oxide, is a polymer having a good ability to dissolve ion-conductive salts as noted above, but at the same time, a semi-crystalline polymer. Because of the latter nature, when a large amount of metallic salt is dissolved in polyethylene oxide, the salt forms a pseudo-crosslinked structure between the polymer chains that leads to crystallization of the polymer. As a result, the ionic conductivity is much lower than predicted.

The reason is as follows. When an ion conductor is dissolved in a linear polyether-based polymer matrix such as polyethylene oxide, the ion conductor migrates, at temperatures above the glass transition temperature of the polymer matrix, through amorphous regions of the polymer matrix along with the local movement of polymer chain segments. Since the cations accounting for ionic conductivity are strongly coordinated by the polymer chains, the local movement of the polymer chains has a strong influence on cation mobility. The local movement of the polymer chains is called Brownian motion.

Therefore, a linear polyether-based polymer such as polyethylene oxide is a poor choice as the matrix polymer for an ion-conductive polymer electrolyte. In fact, according to the literature to date, ion-conductive polymer electrolytes composed entirely of linear polymers such as polyethylene oxide, polypropylene oxide or polyethyleneimine generally have an ion conductivity at room temperature of about $10^{-6}$ S/cm, and at best no more than about $10^{-6}$ S/cm.

To obtain ion-conductive polymer electrolytes having a high conductivity, a molecule must be designed which allows the existence within the matrix polymer of many amorphous regions conducive to ion conductor mobility, and which does not crystallize even with the dissolution therein of ion-conductive salts to a high concentration. One such method is the attempt to introduce a branched structure into polyethylene oxide, as described in N. Ogata et al., Journal of the Japan Textile Society, pp. 52–57, 1990. Their work demonstrates that ion-conductive solid polymer electrolytes composed of a polyethylene oxide derivative having a high ionic conductivity (about $10^{-4}$ S/cm at room temperature) can indeed be synthesized. However, commercialization of such polymer electrolytes has not been achieved due to the sheer complexity of the method of polymer synthesis involved.

There have also been reports on methods of attaining ion conductivity by imparting to the matrix polymer a three-dimensional network structure so as to impede the formation of a crystalline structure. One example of the use of a polymer having a three-dimensional network structure as the polymer matrix is a method of polymerizing an acrylic monomer or methacrylic monomer containing a polyoxyalkylene component as disclosed in JP-A 5-25353. This method, however, has a number of problems including the low solubility of the ion-conductive salt in the monomer, which necessitates the addition of a third component such as vinylene carbonate, and the low physical strength of the resulting polymer.

SUMMARY OF THE INVENTION

Therefore, one object of the present invention is to provide a novel polymeric compound, a polymer for a polymer electrolyte comprising the same, and a polymer electrolyte composition having a high ionic conductivity.

The inventor has found that a novel polymeric compound comprising units of the formulas (1) and (2) to be defined below, wherein at least 10% of the ends of molecular chains are capped with one or more substituents selected from the group consisting of halogen atoms, substituted or unsubstituted monovalent hydrocarbon groups, $R^1CO-$ groups (wherein $R^1$ is a substituted or unsubstituted monovalent hydrocarbon group), $R^1{}_3Si-$ groups (wherein $R^1$ is as defined above), amino groups, alkylamino groups, $H(OR^2)_m-$ groups (wherein $R^2$ is an alkylene group having 2 to 4 carbons, and letter m is an integer of 1 to 100), and phosphorus-containing groups, and especially with cyano-substituted monovalent hydrocarbon groups or a mixture of cyano-substituted monovalent hydrocarbon groups and $R^1{}_3Si$—groups, has a high electrochemical stability. The polymeric compound also has an ability to dissolve an ion-conductive salt to a high concentration, and does not crystallize and remains amorphous even with the dissolution of an ion-conductive salt to a high concentration. This means that the polymeric compound is an amorphous polymer ensuring the free mobility of an ion conductor therethrough. It has also been found that a composition comprising an ion-conductive salt dissolved in the polymer in high concentrations exhibits an excellent ionic conductivity and is best suited as a polymer electrolyte in a lithium-type secondary cell.

Accordingly, the invention provides a polymeric compound comprising a unit of the following formula (1) and a unit of the following formula (2).

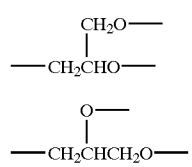

At least 10% of the ends of molecular chains are capped with monovalent groups of at least one type selected from the group consisting of halogen atoms, substituted or unsubstituted monovalent hydrocarbon groups, $R^1CO$— groups, $R^1{}_3Si$— groups, amino groups, alkylamino groups, $H(OR^2)_m$— groups, and phosphorus-containing groups wherein $R^1$ is a substituted or unsubstituted monovalent hydrocarbon group, $R^2$ is an alkylene group having 2 to 4 carbons, and the letter m is an integer from 1 to 100.

In a second aspect, the invention provides a polymer for a polymer electrolyte comprising the polymeric compound defined above. In a third aspect, the invention provides an ion-conductive polymer electrolyte composition primarily comprising the polymer for a polymer electrolyte and an ion-conductive salt.

DETAILED DESCRIPTION OF THE INVENTION

Figure 1:
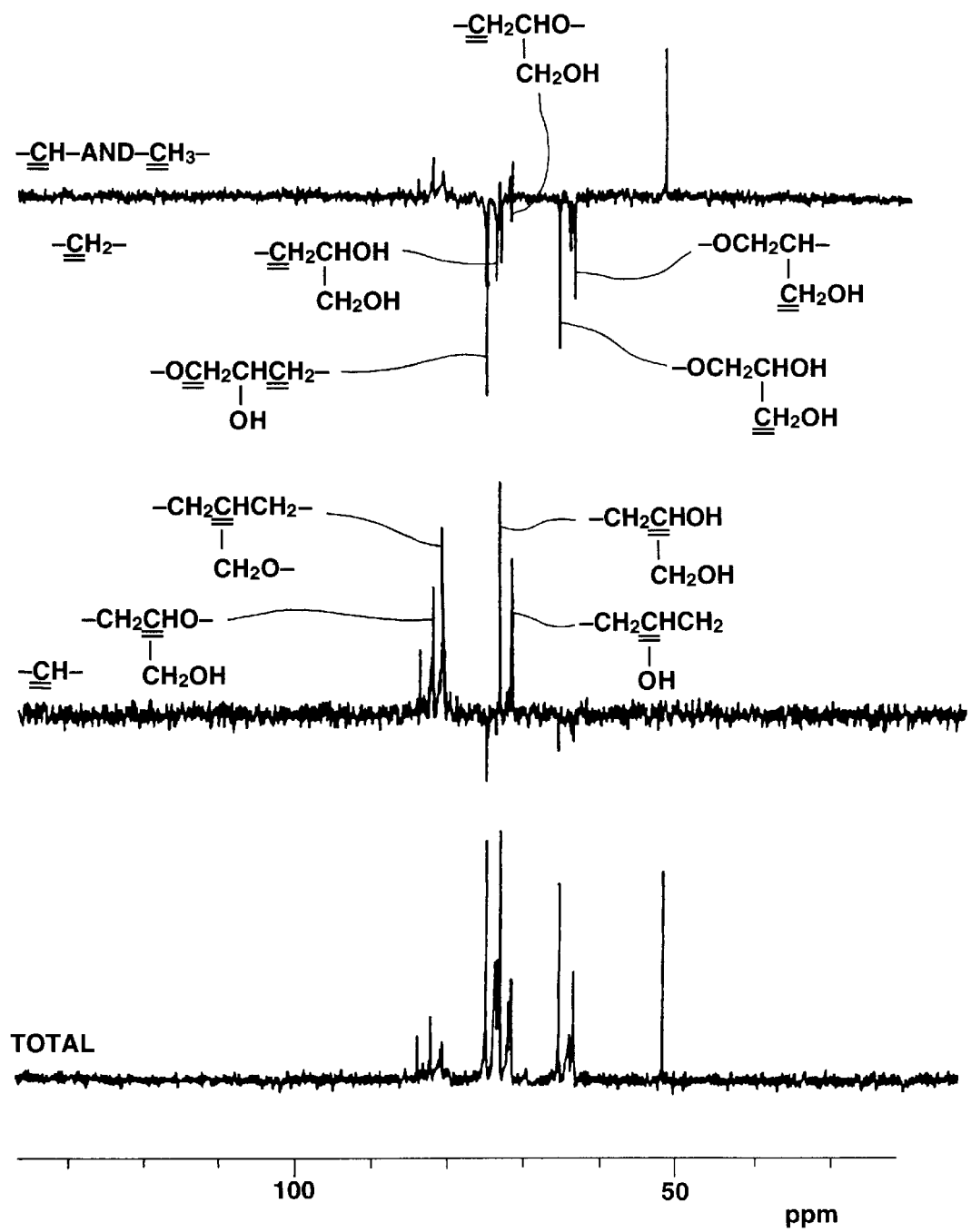
FIG. 1 is the $^{13}$C-NMR spectrum of the polyglycidol prepared in Synthesis Example 1.

The high-molecular-weight or polymeric compound of the invention has a molecular chain comprised of A units of above formula (1) and B units of above formula (2). The molecular chain of the polymeric compound is a polyglycidol as understood from the formulas. Some or all of the molecular chain ends are capped with specific monovalent groups.

The molecular chain of the polyglycidol compound can be formed by polymerizing either glycidol or 3-chloro-1,2-propanediol, although it is generally advisable to carry out polymerization using glycidol as the starting material.

Known methods for carrying out the polymerization reaction include:

(1) processes conducted with a basic catalyst such as sodium hydroxide, potassium hydroxide or various amine compounds; and (2) processes carried out with a Lewis acid catalyst (see A. Dworak et al., Macromol. Chem. Phys., 196, 1963-1970 (1995); and R. Toker, Macromolecules, 27, 320-322 (1994)).

Approach (1) involving polymerization with a basic catalyst is often carried out by adding an alcoholic compound (or an active hydrogen compound) as the initiation point, but a high-molecular-weight polymer is difficult to achieve. The reaction mechanism is shown below.

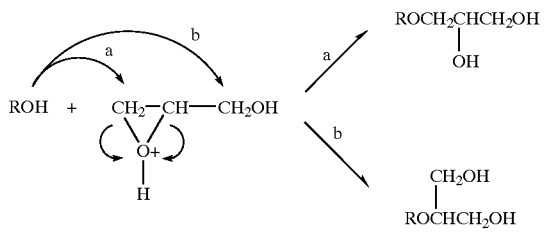

This polymerization process specifically comprises charging a flask with a predetermined amount of glycidol, adding methylene chloride as the solvent, setting the system to a predetermined temperature, adding a predetermined amount of potassium hydroxide as the catalyst, and stirring to effect the reaction. An active hydrogen compound may be included in the reaction mixture if necessary. After reaction completion, methanol is added to stop the reaction, following which the methanol and methylene chloride are driven off in vacuo. The resulting polymer is dissolved in water and neutralized using an ion-exchange resin, following which the ion-exchange resin is removed by filtration. Water is driven from the filtrate in vacuo, and the residue is dried, yielding polyglycidol.

Examples of the active hydrogen compound that may used here include alcohols such as ethanol, methanol, isopropanol and benzyl alcohol; polyols such as glycerol, pentaerythritol, sorbitol, diethylene glycol, ethylene glycol, triose, tetraose, pentose and hexose; and hydroxyl group-bearing polymeric compounds such as polyvinyl alcohol and polyethylene vinyl alcohol.

The molar ratio of (molar quantity of the active hydrogen groups of the additional active hydrogen compounds)/ (molar quantity of the additional glycidol) is preferably from 1/10,000 to 1/1, more preferably from 1/1,000 to 1/1, even more preferably from 5/1,000 to 5/10, and most preferably from 1/100 to 1/10.

In approach (2) involving polymerization using a Lewis acid catalyst, the polymerization reaction is carried out in a nonaqueous system. The reaction mechanism is shown below.

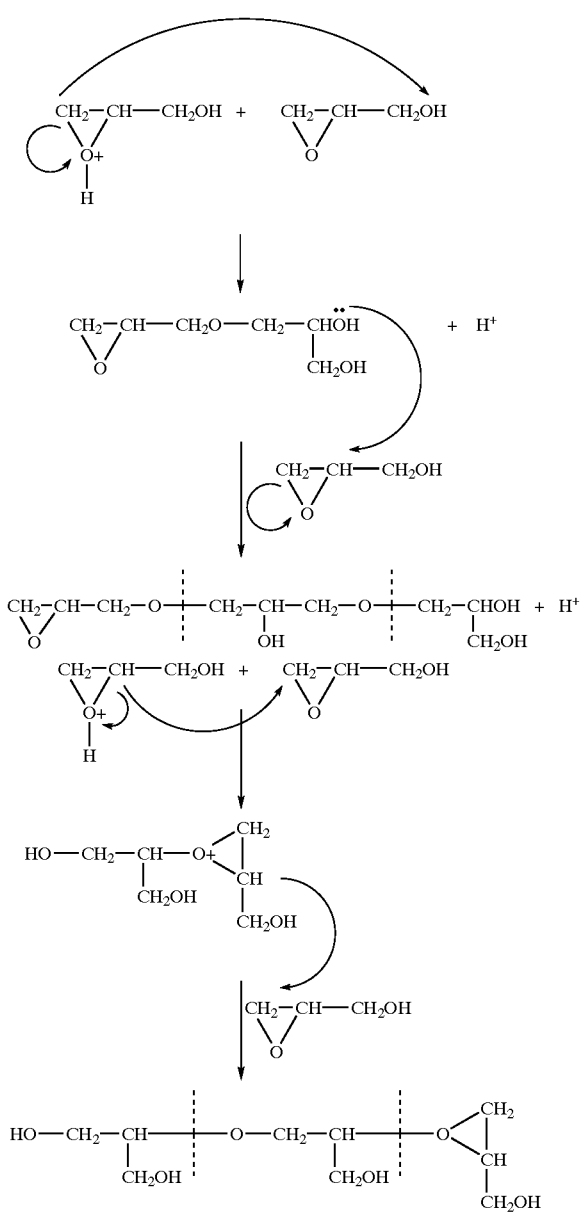

Specifically, this polymerization process is carried out by charging a flask with a predetermined amount of glycidol, using methylene chloride as a solvent if necessary, adding a predetermined amount of catalyst (reaction initiator), and stirring the reaction mixture at a predetermined temperature and under a nitrogen stream to thereby effect reaction. Following reaction completion, methanol is added to stop the reaction, and the methanol and methylene chloride are distilled off in vacuo. The resulting polymer is dissolved in water and neutralized with sodium hydrogencarbonate, following which the solution is passed through an ion-exchange resin-filled column. The eluate is filtered, water is driven from the filtrate in vacuo, and the residue is dried, yielding polyglycidol.

Examples of the catalyst or reaction initiator used in this process include trifluoroborate diethyl etherate ($BF_3 \cdot OEt_2$), $SnCl_4$ and $HPF_6 \cdot OEt_2$. Here, "Et" refers to ethyl group.

The resulting polyglycidol is terminated with a hydroxyl (OH) group. It is confirmed by spectroscopic analysis that the polyglycidol is composed of two units A and B.

Specifically, the $^{13}$C-NMR spectrum (DEPT spectrum measured with a Varian VXR-300 NMR spectrometer, using $D_2O$ as the solvent) of the polyglycidol includes peaks for carbons belonging to the two units A and B, as shown in FIG. 1

The total number of units A and B in the polyglycidol molecule is at least two, preferably at least six, and most preferably at least ten. No particular upper limit is imposed on the total number of these A and B units, although the total is preferably not more than 10,000. If the polyglycidol is requested to have fluidity as a liquid, a small total number of A and B units is preferred. On the other hand, if the polyglycidol must have a high viscosity, a large total number is preferred.

The arrangement of these A and B units is random and without regularity. For example, the units may have any of the following arrangements: -A-A-A-, -A-A-B-, -A-B-A-, -B-A-A-, -A-B-B-, -B-A-B-, -B-B-A- and -B-B-B-.

The polyglycidol has a polyethylene glycol equivalent weight-average molecular weight (Mw) of preferably 200 to 730,000, more preferably 200 to 100,000, and especially 600 to 20,000, as determined by gel permeation chromatography (GPC). Polyglycidol having a weight-average molecular weight of up to about 2,000 is a highly viscous liquid that flows at room temperature, whereas polyglycidol with a weight-average molecular weight above 3,000 is a soft, pasty solid at room temperature. The dispersity, defined as weight-average molecular weight divided by number-average molecular weight (Mw/Mn), of the polyglycidol is preferably from 1.1 to 20, and more preferably from 1.1 to 10.

Depending on its molecular weight, the polyglycidol varies in appearance at room temperature (20° C.) from a highly viscous taffy-like liquid to a rubbery solid. The higher the molecular weight, the more it qualifies as a solid (albeit, a soft, paste-like solid) having a low fluidity at room temperature.

The polyglycidol, regardless of its molecular weight, is not a linear polymer, but rather an amorphous polymer due to the interlocking of its highly branched molecular chains. This is evident from the absence of any peaks in the wide-angle x-ray diffraction pattern that would suggest the presence of crystals.

Figure 2:
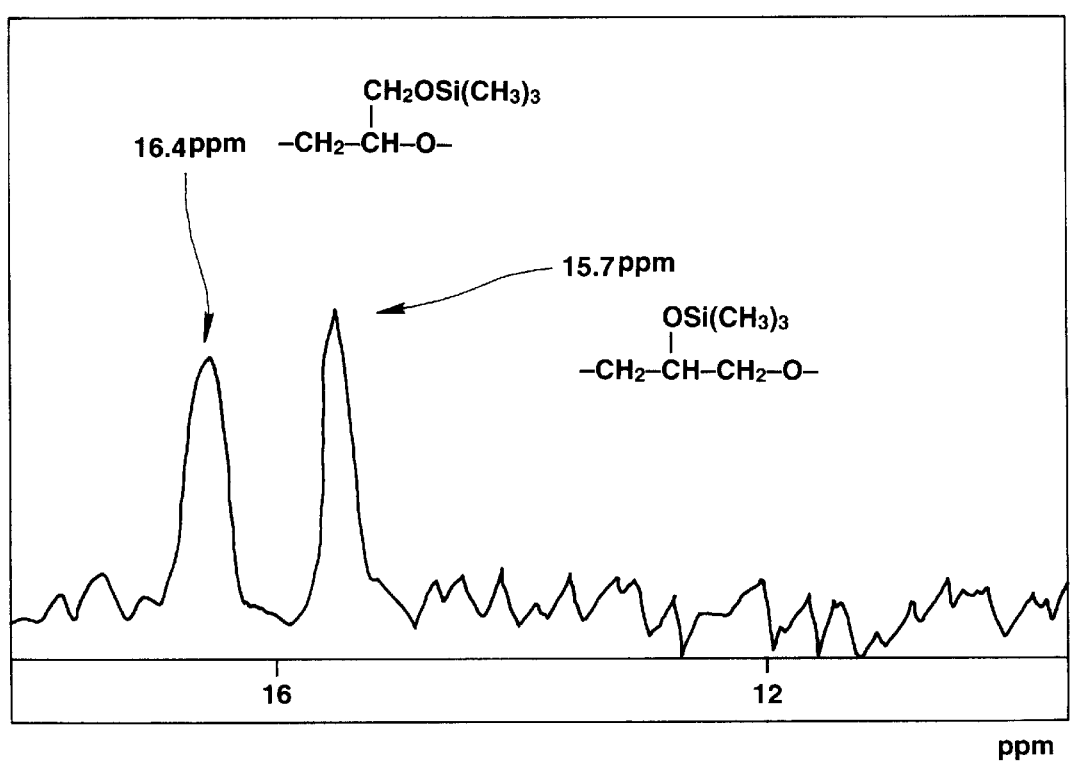
FIG. 2 is the $^{29}$Si-NMR spectrum of a trimethyl-silylated polyglycidol obtained from the polyglycidol in Synthesis Example 1.
Figure 3:
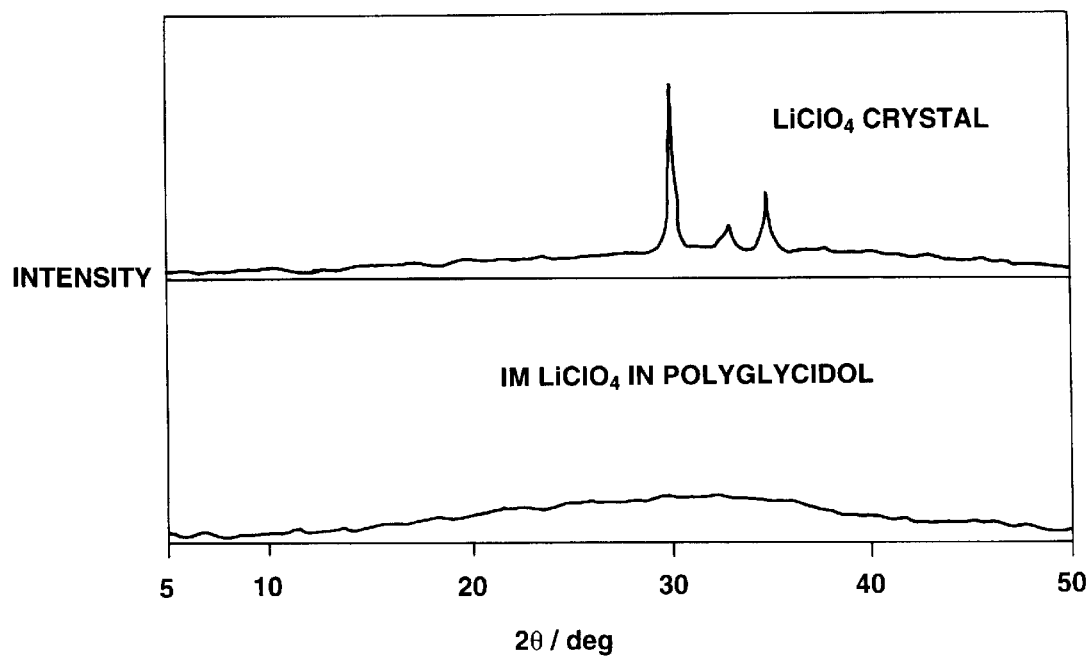
FIG. 3 shows the wide-angle x-ray scattering spectra obtained for lithium perchlorate crystals (top) and for the complex obtained by dissolving a concentration of 1 M lithium perchlorate in polyglycidol having a weight-average molecular weight of 4,000 (bottom).

The ratio of A units and B units in the molecule can be determined by measuring, as shown in FIG. 2, the $^{29}$Si-NMR spectrum for trimethylsilylated polyglycidol prepared by introducing trimethylsilyl groups at the hydroxyl groups on the polyglycidol. The molar ratio of A units to B units is preferably from 1/9 to 9/1, and more preferably from 3/7 to 7/3.

Because the polyglycidol is clear, colorless, and nontoxic, it can be used in a broad range of applications, including electrochemical materials (e.g., binders for various electrode-active materials, such as electroluminescent material binders), thickeners, and alkylene glycol substitutes.

The polymeric compound of the invention has a hydroxyl group at each end of a molecular chain of polyglycidol. According to the invention, at least 10% of the terminal hydroxyl groups are capped with one or more types of monovalent groups selected from among halogen atoms, substituted or unsubstituted monovalent hydrocarbon groups, $R^1CO$— groups (wherein $R^1$, here and below, is a substituted or unsubstituted monovalent hydrocarbon group), $R^1_3Si$— groups, amino groups, alkylamino groups, $H(OR^2)_m$— groups (wherein $R^2$ is an alkylene group having 2 to 4 carbons, and the letter m is an integer from 1 to 100), and phosphorus-containing groups.

The purpose of capping the end groups on the polyglycidol molecular chains is two-fold. (1) In polymers containing a high concentration of ion-conductive salts, recombination of free metal cation with paired anion readily arises in the low-dielectric-constant polymer matrix, lowering the conductivity. Because raising the polarity of the polymer matrix discourages ion association, one aim is to increase the dielectric constant of the matrix polymer by introducing polar groups onto the polyglycidol side chains (hydroxyl groups). (2) The second aim is to impart the polymer electrolyte polymer with highly desirable characteristics, such as hydrophobic properties and fire retardance.

To increase the dielectric constant of the polymeric compound according to the first of these aims, the polyglycidol is reacted with a hydroxyl group-reactive compound, thereby capping the hydroxyl end groups on the polyglycidol molecular chains with highly polar moieties.

The highly polar moieties used for this purpose are not subject to any particular limitation. Examples of preferred moieties include those which are more neutral than ionic moieties, such as substituted or unsubstituted monovalent hydrocarbon groups, $R^1CO$— groups and $H(OR^2)_m$— groups (wherein $R^1$ is a substituted or unsubstituted monovalent hydrocarbon group, $R^2$ is an alkylene group having 2 to 4 carbons, and the letter m is an integer from 1 to 100). If necessary, capping can also be carried out with other suitable moieties, such as amino groups and alkylamino groups.

The second purpose of capping mentioned above, which is to confer hydrophobic properties and fire retardance to the polymeric compound, can be achieved by the use of, for example, halogen atoms, $R^1_3Si$— groups ($R^1$ being as defined above) or phosphorus-containing groups to cap the hydroxyl end groups on the polyglycidol molecular chains.

More specifically, examples of halogen atoms that may be used as the capping moiety include fluorine, bromine and chlorine. Examples of the unsubstituted monovalent hydrocarbon groups having 1 to 10 carbons, and preferably 1 to 8 carbons, that may be used as the capping moiety include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl and xylyl; aralkyl groups such as benzyl, phenylethyl and phenylpropyl; alkenyl groups such as vinyl, allyl, propenyl, isopropenyl, butenyl, hexenyl, cyclohexenyl and octenyl. Examples of the substituted monovalent hydrocarbon groups include any of the above unsubstituted monovalent hydrocarbon groups on which some or all of the hydrogen atoms have been substituted with, among others, halogens (e.g., fluorine, bromine, chlorine), cyano groups, hydroxyl groups, $H(OR^2)_m$— groups ($R^2$ is an alkylene group having 2 to 4 carbons, and the letter m is an integer from 1 to 100), amino groups, aminoalkyl groups or phosphono groups. Illustrative examples of the latter substituted capping moieties include cyanated alkyl groups (e.g., cyanoethyl, cyanobenzyl), chloromethyl, chloropropyl, bromoethyl, and trifluoropropyl. Any one or combination of two or more of the above capping moieties may be used.

Examples of suitable $R^1CO$— groups include those in which $R^1$ is an unsubstituted monovalent hydrocarbon group having 1 to 10 carbons, and preferably 1 to 8 carbons as exemplified above, and a substituted monovalent hydrocarbon group in which some or all of the hydrogen atoms on the unsubstituted monovalent hydrocarbon groups have been substituted with the substituent group as exemplified above. $R^1$ is preferably an alkyl or phenyl group, such as acyl, benzoyl and cyanobenzoyl groups.

Examples of suitable $H(OR^2)_m$— groups include those in which $R^2$ is an alkylene group having 2 to 4 carbons (e.g., ethylene, propylene, butylene) and the letter m is an integer from 1 to 100, and preferably 2 to 70. Use may also be made of mixtures of two or more from among ethyleneoxy, propyleneoxy and butyleneoxy groups.

Examples of suitable $R^1_3Si$— groups include those in which $R^1$ is as defined above and represents the same unsubstituted monovalent hydrocarbon groups having 1 to 10 carbons, and preferably 1 to 8 carbons, and the same substituted monovalent hydrocarbon groups as above. $R^1$ most preferably stands for an alkyl group. Of these, trialkylsilyl groups, and especially trimethylsilyl groups, are preferred.

Additional examples of suitable capping moieties include amino groups, alkylamino groups and phosphorus-containing groups.

The proportion of end groups capped with the above moieties is preferably at least 10%, more preferably at least 50%, and most preferably at least 90%. Capping of substantially all the end groups (for a capping ratio of about 100%) with the above moieties may even be carried out.

Because there are cases in which the ability of the polymer to dissolve the ion-conductive salt diminishes when all the end groups on the polymer molecular chains are capped with halogen atoms, $R^1_3Si$— groups or phosphorus-containing groups, it is necessary to introduce a suitable amount of capping moieties while paying close attention to the dissolving ability of the polymer. An appropriate amount is 10 to 95%, preferably 50 to 95%, and more preferably 50 to 90%, based on the total number of hydroxyl end groups.

The capping moiety used in the practice of the invention is most preferably a cyanated monovalent hydrocarbon group or a combination of a cyanated monovalent hydrocarbon group with a $R^1_3Si$— group. Illustrative examples include cyanated alkyl groups such as cyanoethyl, cyanobenzyl and cyanobenzoyl, and trimethylsilyl in combination with any of these cyanated monovalent hydrocarbon groups.

When a cyanated monovalent hydrocarbon group such as cyanoethyl is used in combination with a $R^1_3Si$— group such as trimethylsilyl, it is advantageous for the two components to be in relative proportions of 70 to 97%, preferably 90 to 97%, of cyanated monovalent hydrocarbon groups, and 30 to 3%, preferably 10 to 3%, of $R^1_3Si$— groups, based on all the hydroxyl end groups on the molecular chains. Polymers in which cyanated monovalent hydrocarbon groups and $R^1_3Si$— groups are incorporated together in this way possess excellent electrical conductivity and hydrophobic properties.

If cyanoethyl groups are introduced as the capping moiety, the method for capping the polyglycidol molecular chains may comprise mixing the polyglycidol with dioxane and acrylonitrile, adding a sodium hydroxide solution to the mixture, and stirring to effect the reaction. This yields cyanoethylated polyglycidol in which cyanoethyl groups are introduced on some or all of the side chains.

The introduction of acetyl groups as the capping moiety may be carried out by, for example, mixing the polyglycidol with acetic acid and methylene chloride, adding an aqueous perchlorate solution and anhydrous acetic acid to the mixture, then reacting at room temperature under stirring. The reaction mixture is subsequently added to cold water, whereupon a precipitate settles out. The precipitate is collected, dissolved in acetone, then poured once again into water. The resulting mixture is neutralized by adding sodium hydrogen carbonate, and the precipitate that forms is collected by filtration, placed together with water in dialysis tubing and dialyzed with ion-exchanged water. The resulting precipitate is collected, rinsed with water, then dried in vacuo, giving acetylated polyglycidol.

Cyanobenzoyl groups may be introduced as the capping moieties by a method which involves, for example, mixing the polyglycidol with dioxane and adding pyridine, followed by the dropwise addition of a solution of cyanobenzoyl chloride in dioxane. The solution is then reacted at a predetermined temperature, after which the reaction mixture is poured into a methanol/water (3:4) solution. The precipitate that settles out of solution is collected, then dissolved in N,N-dimethylsulfoxide, following which the solution is placed in dialysis tubing and dialyzed. The resulting precipitate is collected, rinsed with water, then dried in vacuo, giving cyanobenzoylated polyglycidol.

The introduction of trimethylsilyl groups may be carried out by dissolving the polyglycidol in dimethylacetamide, adding bis(trimethylsilyl)acetamide to the solution, and stirring at room temperature to effect reaction. The reaction mixture is then cooled in an ice-water bath, and poured into a cold methanol/water (4:1) solution. The precipitate that settles out is collected by filtration, then is dissolved in acetamide and the solution is passed through filter paper. The solution is then dried in vacuo, yielding trimethylsilylated polyglycidol.

Capping with other suitable capping moieties may likewise be carried out using known techniques for introducing those moieties onto terminal hydroxyl groups.

The polymeric compound or polyglycidol derivative of the invention is best suited for use as a polymer electrolyte polymer. More particularly, it is used in two ways as either a liquid ion-conductive polymer electrolyte composition or a solid polymer electrolyte composition. In either case, the ion-conductive polymer electrolyte composition contains as essential components (A) a polymer for a polymer electrolyte comprising the above-defined polymeric compound and (B) an ion-conductive salt.

The ion-conductive salt serving as component (B) is not subject to any particular limitation so long as it can be used in conventional electrochemical devices. Illustrative examples include $LiClO_4$, $LiBF_4$, $LiAsF_6$, $LiPF_6$, $LiSbF_6$, $LiCF_3SO_3$, $LiCF_3COO$, $NaClO_4$, $NaBF_4$, $NaSCN$, $KBF_4$, $Mg(ClO_4)_2$, $Mg(BF_4)_2$, $(C_4H_9)_4NBF_4$, $(C_2H_5)_4NBF_4$ and $(C_4H_9)_4NClO_4$. Any one or combinations of two or more of these may be used.

The amount of the ion-conductive salt included in the inventive composition varies empirically according to a number of factors, including the type of ion-conductive salt used, the molecular weight of the polyglycidol derivative, and the type of capping moiety. In general, the amount of ion-conductive salt included is preferably 5 to 1,000 parts by weight, more preferably 10 to 500 parts by weight, and most preferably 10 to 100 parts by weight, per 100 parts by weight of polyglycidol derivative. Too little ion-conductive salt may result in a weak concentration of the ion conductor, making the electrical conductivity too low for practical purposes. On the other hand, with the use of too much ion-conductive salt, the capacity of the polymer matrix to dissolve the salt may be exceeded, resulting in salt deposition.

In addition to above components (A) and (B), the ion-conductive polymer electrolyte composition of the invention may include also an ordinary amount of a solvent capable of dissolving the ion-conductive salt. Suitable examples of such solvents include chain ethers, such as dibutyl ether, 1,2-dimethoxyethane, 1,2-ethoxymethoxyethane, methyl diglyme, methyl triglyme, methyl tetraglyme, ethyl glyme, ethyl diglyme, butyl diglyme, and glycol ethers (e.g., ethyl cellosolve, ethyl carbitol, butyl cellosolve, butyl carbitol); heterocyclic ethers such as tetrahydrofuran, 2-imethyltetrahydrofuran, 1,3-dioxolane and 4,4-dimethyl-1,3-dioxane; butyrolactones such as y-butyrolactone, γ-valerolactone, δ-valerolactone, 3-methyl-1,3-oxazolidin-2-one and 3-ethyl-1,3-oxazolidin-2-one; and solvents commonly used in electrochemical devices, such as water, alcohol solvents (e.g., methanol, ethanol, butanol, ethylene glycol, propylene glycol, diethylene glycol, 1,4-butanediol and glycerol), polyoxyalkylene polyols (e.g., ethylene oxide, polypropylene oxide, polyoxyethylene-oxypropylene glycol and mixtures of two or more thereof), amide solvents (e.g., N-methylformamide, N,N-dimethylformamide, N-methylacetamide and N-methylpyrrolidinone), carbonate solvents (e.g., propylene carbonate, ethylene carbonate, styrene carbonate), and imidazolidinone solvents (e.g., 1,3-dimethyl-2-imidazolidinone). These solvents may be used singly or as mixtures of two or more thereof.

The polymer electrolyte composition of the invention varies in appearance at room temperature (20° C.) from a highly viscous taffy-like liquid to a rubbery solid. The higher the molecular weight, the more it qualifies as a solid (albeit, a soft, paste-like solid) having a low fluidity at room temperature.

It is believed that in the polymer electrolyte composition of the invention, the ion-conductive salt is completely dissociated in the polymer because no peaks attributable to the ion-conductive salt are found in the wide-angle x-ray diffraction pattern. Compositions containing 100 parts by weight of the polyglycidol derivative and 9 to 15 parts by weight of the ion-conductive salt exhibit a high conductivity of about $10^{-3}$ to $10^{-4}$ S/cm, as measured by the ac impedance method.

The polymer electrolyte composition of the invention does not crystallize and remains amorphous even when the ion-conductive salt is added in high concentrations, allowing free mobility of metal ions within the molecule. In addition, the polymer electrolyte composition develops a high potential, eliminates concerns about evaporation and liquid leakage, and provides flame retardance. The polymer electrolyte composition lends itself well to use as an electrolyte in lithium ion secondary cells and other types of cells.

The polymer electrolyte composition of the invention becomes a liquid polymer electrolyte when a polyglycidol having a low molecular weight is used and a solid polymer electrolyte when a polyglycidol having a fully high molecular weight is used, exhibiting excellent conductivity in either case. Since the solid polymer electrolyte, though designated solid, is a rubbery solid prone to plastic deformation, that is, deformation by the application of stresses, it can be readily formed into a film sheet.

EXAMPLES

The following examples are provided to illustrate the nvention, and are not intended to limit the scope thereof. All parts are by weight.

Synthesis Example 1

A flask was charged with glycidol and methylene hloride to a glycidol concentration of 4.2 mol/L, and the reaction temperature was set at −10° C. Trifluoroborate-diethyl etherate ($BF_3 \cdot OEt_2$) was added as the catalyst (reaction initiator) to a concentration of $1.2 \times 10^{-2}$ mol/L. The mixture was stirred for 3 hours under a stream of nitrogen to effect the reaction. Following reaction completion, methanol was added to stop the reaction, and the methanol and methylene chloride were removed by distillation in a vacuum.

The resulting polymer was dissolved in water and neutralized with sodium hydrogencarbonate, after which the solution was passed through a column packed with an ion-exchange resin produced by Organo Corporation under the trade name Amberlite IRC-76. The eluate was passed through 5C filter paper, after which the filtrate was distilled in vacuo and the residue from distillation was dried.

The thus obtained polyglycidol was analyzed by gel permeation chromatography (GPC) using 0.1 M saline as the mobile phase, from which the polyethylene glycol equivalent weight-average molecular weight was calculated to be 6,250. The polyglycidol was found amorphous when the crystallinity was determined by wide-angle x-ray diffraction analysis. The polyglycidol was a soft, paste-like solid at room temperature. FIG. 1 shows the $^{13}$C-NMR spectrum (DEPT spectrum measured with a Varian VXR-300 NMR spectrometer, using $D_2O$ as the solvent).

Synthesis Example 2

A flask was charged with glycidol and methylene chloride to a glycidol concentration of 15 mol/L, and the reaction temperature was set at −10° C. A catalyst or reaction initiator in the form of $HPF_6 \cdot OEt_2$ was added to a concentration of $1.8 \times 10^{-3}$ mol/L. The mixture was stirred for 56 hours under a stream of nitrogen to effect the reaction. Following reaction completion, methanol was added to stop the reaction, and the methanol and methylene chloride were removed by distillation in a vacuum.

The resulting polymer was dissolved in water and neutralized with sodium hydrogencarbonate, after which the solution was passed through a column packed with an ion-exchange resin produced by Organo Corporation under the trade name Amberlite IRC-76. The eluate was passed through 5C filter paper, after which the filtrate was distilled in vacuo and the residue from distillation was dried.

The thus obtained polyglycidol was analyzed by GPC using 0.1 M saline as the mobile phase, from which the polyethylene glycol equivalent weight-average molecular weight was calculated to be 21,530. The polyglycidol was found amorphous upon crystallinity determination by wide-angle x-ray diffraction analysis, and appeared to be a soft, paste-like solid at room temperature.

Synthesis Example 3

A flask was charged with 100 parts of glycidol and 10,000 parts of methylene chloride and set at 20° C. Potassium hydroxide, 20 parts, was added as the catalyst. The mixture was stirred for 22 hours to effect the reaction. Following reaction completion, methanol was added to stop the reaction, and the methanol and methylene chloride were removed by distillation in a vacuum.

The resulting polymer was dissolved in water and neutralized with an ion-exchange resin produced by Organo Corporation under the trade name Amberlite IRC-76. After the ion-exchange resin was removed by filtration, the polymer was dried by distilling off water in vacuum.

The thus obtained polyglycidol was analyzed by GPC using 0.1 M saline as the mobile phase, from which the polyethylene glycol equivalent weight-average molecular weight was calculated to be 1,100. The polyglycidol was found amorphous upon crystallinity determination by wide-angle x-ray diffraction analysis, and appeared to be a highly viscous liquid at room temperature.

Example 1

Cyanoethylation of Polyglycidol

Three parts of the polyglycidol prepared in Synthesis Example 3 was mixed with 20 parts of dioxane and 14 parts of acrylonitrile. To this mixed solution was added aqueous sodium hydroxide comprising 0.16 part of sodium hydroxide dissolved in 1 part of water, and stirring was carried out for 10 hours at 25° C. to effect the reaction. After reaction completion, 20 parts of water was added to the mixture, which was then neutralized using an ion-exchange resin (Amberlite IRC-76, produced by Organo Corporation). The ion-exchange resin was separated off by filtration, after which 50 parts of acetone was added to the solution and the insolubles were filtered off. The filtrate was vacuum concentrated, yielding crude cyanoethylated polyglycidol. This crude cyanoethylated polyglycidol was dissolved in acetone and the solution was filtered using 5A filter paper, following which the polyglycidol was precipitated out of solution in water and the precipitate was collected. These two operations (dissolution in acetone, and precipitation in water) were repeated twice, following which the product was dried in vacuo at 50° C., giving purified cyanoethylated polyglycidol.

The infrared absorption spectrum of the cyanoethylated polyglycidol showed no hydroxyl group absorption, indicating that all the hydroxyl groups had been substituted with cyanoethyl groups. Wide-angle x-ray diffraction analysis to determine the crystallinity showed that the product was amorphous at room temperature. In addition, the room temperature state of the polyglycidol was visually examined. The results are shown in Table 1.

Example 2

Cyanoethylation of Polyglycidol

Pure cyanoethylated polyglycidol was prepared by the same method as in Example 1 using the polyglycidol prepared in Synthesis Example 1.

The infrared absorption spectrum of the cyanoethylated polyglycidol showed no hydroxyl group absorption, indicating that all the hydroxyl groups had been substituted with cyanoethyl groups. Wide-angle x-ray diffraction analysis to determine the crystallinity showed that the product was amorphous at room temperature. In addition, the room temperature state was visually examined. The results are shown in Table 1.

Example 3

Cyanoethylation of Polyglycidol

Pure cyanoethylated polyglycidol was prepared by the same method as in Example 1 using the polyglycidol obtained in Synthesis Example 2.

The infrared absorption spectrum of the cyanoethylated polyglycidol showed no hydroxyl group absorption, indicating that all the hydroxyl groups had been substituted with cyanoethyl groups. Wide-angle x-ray diffraction analysis to determine the crystallinity showed that the product was amorphous at room temperature. In addition, the room temperature state was visually examined. The results are shown in Table 1.

Example 4

Cyanoethyl-trimethylsilylation of Polyglycidol

Three parts of the polyglycidol prepared in Synthesis Example 1 was mixed with 20 parts of dioxane and 14 parts of acrylonitrile. To this mixed solution was added aqueous sodium hydroxide comprising 0.16 part of sodium hydroxide dissolved in 1 part of water, and stirring was carried out for 5 hours at 25° C. to effect the reaction. After reaction completion, 20 parts of water was added to the mixture, which was then neutralized using an ion-exchange resin (Amberlite IRC-76, produced by Organo Corporation). The ion-exchange resin was separated off by filtration, after which 50 parts of acetone was added to the solution and the insolubles were filtered off. The filtrate was vacuum concentrated, yielding crude cyanoethylated polyglycidol.

One part of this crude cyanoethylated polyglycidol was dissolved in dimethylacetamide, following which 2 parts of bis(trimethylsilyl)acetamide was added to the solution, and stirring carried out at room temperature for 5 hours. The reaction mixture was cooled in an ice-water bath, and poured into a methanol/water (4:1) solution that had been cooled to 0° C. The precipitate that settled out was collected by filtration, then dissolved in acetamide. The resulting solution was passed through 5C filter paper, then dried in vacuo, yielding cyanoethyl-trimethylsilylated polyglycidol.

The infrared absorption spectrum of the cyanoethyl-trimethylsilylated polyglycidol showed no hydroxyl group absorption. Results from elemental analysis indicated that the proportion of hydroxyl groups which had been cyanoethylated was 87%, and that the remaining 13% of hydroxyl groups had been trimethylsilylated. Wide-angle x-ray diffraction analysis to determine the crystallinity showed that the product was amorphous at room temperature. In addition, the room temperature state was visually examined. The results are shown in Table 1.

Example 5

Acetylation of Polyglycidol

One part of the polyglycidol prepared in Synthesis Example 1 was mixed with 30 parts of acetic acid and 30 parts of methylene chloride. To this mixture was added 0.4 part of a 60% perchloric acid solution in water and 40 parts of acetic anhydride, and stirring was carried out at room temperature for 8 hours. The reaction mixture was poured into cold water, and the precipitate that settled out was collected. The precipitate was dissolved in acetone and poured once again into water, then neutralized by adding sodium hydrogen carbonate and subsequently filtered with 5C filter paper. The precipitate was collected, placed together with water in dialysis tubing, and dialyzed for 3 days with ion-exchanged water. The resulting precipitate was collected, rinsed with water and dried in vacuo, yielding acetylated polyglycidol.

The infrared absorption spectrum of the acetylated polyglycidol showed no hydroxyl group absorption. However, an absorption peak- attributable to C═O group was observed, indicating that all the hydroxyl groups had been acetylated. Wide-angle x-ray diffraction analysis to determine the crystallinity showed that the product was amorphous at room temperature. In addition, the room temperature state was visually examined. The results are shown in Table 1.

Example 6

Cyanobenzoylation of Polyglycidol

The polyglycidol prepared in Synthesis Example 1 (0.4 part) was mixed with dioxane (10 parts by weight), following which pyridine (1.24 parts) was added. To this was added dropwise a solution of cyanobenzoyl chloride (2.05 parts) in dioxane (10 parts). The solution was set at a temperature of 80° C. and reacted for 12 hours. The reaction mixture was poured into a methanol/water (3:4) solution and the precipitate that settled out was collected. The precipitate was dissolved in N,N-dimethylsulfoxide, the resulting solution was placed in dialysis tubing, and dialysis was carried out for 3 days with ion-exchanged water. The resulting precipitate was collected, rinsed with water and dried in vacuo, yielding cyanobenzoylated polyglycidol.

The infrared absorption spectrum of the cyanobenzoylated polyglycidol showed no hydroxyl group absorption. However, the absorption peaks attributable to C═O and C≡N groups were observed, indicating that all the hydroxyl groups had been cyanobenzoylated. Wide-angle x-ray diffraction analysis to determine the crystallinity showed that the product was amorphous at room temperature. In addition, the room temperature state was visually examined. The results are shown in Table 1.

TABLE 1

| | Starting polyglycidol (weight-average molecular weight) | Capping moiety introduced onto terminal hydroxyl groups of polyglycidol | Crystallinity | Room temperature state |
|---|---|---|---|---|
| Ex. 1 | Syn. Ex. 3 (1,100) | cyanoethyl | amorphous | viscous liquid |
| Ex. 2 | Syn. Ex. 1 (6,250) | cyanoethyl | amorphous | soft, paste-like solid |
| Ex. 3 | Syn. Ex. 2 (21,530) | cyanoethyl | amorphous | soft, paste-like solid |
| Ex. 4 | Syn. Ex. 1 (6,250) | cyanoethyl + trimethylsilyl | amorphous | soft, paste-like solid |
| Ex. 5 | Syn. Ex. 1 (6,250) | acetyl | amorphous | soft, paste-like solid |
| Ex. 6 | Syn. Ex. 1 (6,250) | cyanobenzoyl | amorphous | soft, paste-like solid |

Example 7 To 12

Preparation of Polymer Electrolyte Composition

A polyglycidol derivative as shown in Table 2 and lithium perchlorate were dissolved in tetrahydrofuran. The ingredients were weighed such that the total weight of lithium perchlorate and the polyglycidol derivative was 1 kg per mole of lithium perchlorate.

In each example, the resulting solution was held in a vacuum to allow the tetrahydrofuran to evaporate, yielding a polyglycidol derivative-lithium perchlorate complex (polymer electrolyte composition).

The complex obtained in each example was placed between two copper plates spaced a gap of 200 microns whereupon the electrical conductivity of the complex was determined by the AC impedance measurement technique. The state of the complex at room temperature was visually observed and rated S for soft paste-like solid and L for highly viscous liquid. Wide-angle x-ray diffraction measurement of the complex was carried out to determine the crystallinity. Additionally, the complex was held at 100° C. for 5 hours, following which the weight loss on evaporation was measured. The results are given in Table 2.

Comparative Example 1

A polyethylene glycol-lithium perchlorate complex (polymer electrolyte composition) was prepared by the same method as in Example 7, except that polyethylene glycol having a molecular weight of 200 was used instead of the polyglycidol derivative.

The resulting complex was placed between two copper plates spaced a gap of 200 microns, whereupon the electrical conductivity was determined by the AC impedance measurement technique. The room temperature state was visually examined and rated S or L. Wide-angle x-ray diffraction measurement of the complex was carried out to determine the crystallinity. Additionally, the complex was held at 100° C. for 5 hours, following which the weight loss on evaporation was measured. The results are given in Table 3.

Comparative Example 2

A polyethylene glycol-lithium perchlorate complex (polymer electrolyte composition) was prepared by the same method as in Example 7, except that polyethylene glycol having a molecular weight of 2,000 was used instead of the polyglycidol derivative.

The resulting complex was placed between two copper plates spaced a gap of 200 microns, whereupon the electrical conductivity was determined by the AC impedance measurement technique. The room temperature state was visually examined and rated S or L. Wide-angle x-ray diffraction measurement of the complex was carried out to determine the crystallinity. Additionally, the complex was held at 100° C. for 5 hours, following which the weight loss on evaporation was measured. The results are given in Table 3.

TABLE 2

| | Examples | | | | | |
| --- | --- | --- | --- | --- | --- | --- |
| | 7 | 8 | 9 | 10 | 11 | 12 |
| Polymer | | | | | | |
| Ex. 1 | 1 | | | | | |
| Ex. 2 | | 1 | | | | |
| Ex. 3 | | | 1 | | | |
| Ex. 4 | | | | 1 | | |
| Ex. 5 | | | | | 1 | |
| Ex. 6 | | | | | | 1 |
| PEG 200 | | | | | | |
| PEG 2000 | | | | | | |
| Electrical conductivity (S/cm) | $8.0 \times 10^{-4}$ | $5.2 \times 10^{-4}$ | $2.9 \times 10^{-4}$ | $8.9 \times 10^{-5}$ | $7.0 \times 10^{-5}$ | $5.0 \times 10^{-4}$ |
| Crystallinity | amorphous | amorphous | amorphous | amorphous | amorphous | amorphous |
| Room temperature state | L | S | S | S | S | S |
| Weight loss on evaporation (%) | ≦0.1 | ≦0.1 | ≦0.1 | ≦0.1 | ≦0.1 | ≦0.1 |

TABLE 3

| | Comparative Examples | |
| --- | --- | --- |
| | 1 | 2 |
| Polymer | | |
| Ex. 1 | | |
| Ex. 2 | | |
| Ex. 3 | | |
| Ex. 4 | | |
| Ex. 5 | | |
| Ex. 6 | | |
| PEG 200 | 1 | |
| PEG 2000 | | 1 |
| Electrical conductivity (S/cm) | $9.0 \times 10^{-5}$ | $8.0 \times 10^{-7}$ |
| Crystallinity | amorphous | crystalline |
| Room temperature state | L | S |
| Weight loss on evaporation (%) | ≦0.1 | ≦0.1 |

Note:
PEG 200: polyethylene glycol with a molecular weight of 200
PEG 2000: polyethylene glycol with a molecular weight of 2000
Room temperature state:
  S: soft, paste-like solid
  L: viscous liquid There have been described both novel polymers for polymer electrolytes which have a high ionic conductivity and do not crystallize even when an ion-conductive salt is dissolved in high concentrations, and polymer electrolyte compositions comprising the same.

What is claimed is:

1. A polymeric compound comprising a unit of the formula

—$CH_2CH(CH_2OH)O$— and a unit of the formula —$CH_2CH(OH)CH_2O$— wherein at least 50% of the terminal hydroxyl groups of molecular chains are capped with monovalent groups of at least one type selected from the group consisting of halogen atoms, cyano-substituted monovalent hydrocarbon groups, $R^1CO$— groups wherein $R^1$ is a substituted or unsubstituted monovalent hydrocarbon group having 1 to 10 carbon atoms and selected from the group consisting of alkyl, aryl, aralkyl, and groups in which some or all of the hydrogen atoms of the alkyl, aryl, and aralkyl are substituted with a halogen, cyano, hydroxyl, amino, aminoalkyl, or posphono group, $R^1_3Si$— groups wherein $R^1$ is a substituted or unsubstituted monovalent hydrocarbon group having 1 to 10 carbon atoms and selected from the group consisting of alkyl, aryl, aralkyl, and groups in which some or all of the hydrogen atoms of the alkyl, aryl, and aralkyl are substituted with a halogen, cyano, hydroxyl, amino, aminoalkyl, or posphono group, amino groups, and alkylamino groups.

2. The polymeric compound of claim 1, wherein the end-capping monovalent groups are cyano-substituted monovalent hydrocarbon groups or are a mixture of cyano-substituted monovalent hydrocarbon groups and $R^1_3Si-$ groups.

3. An ion-conductive polymer electrolyte composition primarily comprising the polymeric compound of claim 2 and an ion-conductive salt.

4. The composition of claim 3, wherein said ion-conductive salt is a lithium salt.

5. An ion-conductive polymer electrolyte composition primarily comprising the polymeric compound of claim 1 and an ion-conductive salt.

6. The composition of claim 5, wherein said ion-conductive salt is a lithium salt.

7. The polymeric composition of claim 1, wherein substantially all of the terminal hydroxyl groups are capped with the specified groups.

8. A polymeric compound comprising a unit of the formula $-CH_2CH(CH_2OH)O-$ and a unit of the formula $-CH_2CH(OH)CH_2O-$ wherein at least 50% of the terminal hydroxyl groups of molecular chains are capped with cyanoethyl, a mixture of cyanoethyl and trimethylsilyl, acetyl, or cyanobenzoyl.

9. An ion-conductive polymer electrolyte composition primarily comprising the polymeric compound of claim 8 and an ion-conductive salt.

10. The composition of claim 9, wherein said ion-conductive salt is a lithium salt.

* * * * *